United States Patent
Yokoyama

(10) Patent No.: US 9,509,864 B2
(45) Date of Patent: Nov. 29, 2016

(54) INFORMATION MANAGEMENT SYSTEM, AND PRINTER

(71) Applicant: Seiko Epson Corporation, Tokyo (JP)

(72) Inventor: Kazuyuki Yokoyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/923,864

(22) Filed: Oct. 27, 2015

(65) Prior Publication Data

US 2016/0050327 A1 Feb. 18, 2016

Related U.S. Application Data

(63) Continuation of application No. 14/385,651, filed as application No. PCT/JP2013/003471 on Jun. 3, 2013, now Pat. No. 9,203,982.

(30) Foreign Application Priority Data

Jun. 20, 2012 (JP) .................. 2012-138479
Jun. 20, 2012 (JP) .................. 2012-138481

(51) Int. Cl.
| | |
|---|---|
| G06Q 20/20 | (2012.01) |
| H04N 1/00 | (2006.01) |
| G07G 1/00 | (2006.01) |
| G07G 1/06 | (2006.01) |
| G07G 1/14 | (2006.01) |
| H04N 1/32 | (2006.01) |
| G07G 5/00 | (2006.01) |

(52) U.S. Cl.
CPC ........ *H04N 1/00244* (2013.01); *G06Q 20/209* (2013.01); *G07G 1/00* (2013.01); *G07G 1/0018* (2013.01); *G07G 1/06* (2013.01); *G07G 1/14* (2013.01); *G07G 5/00* (2013.01); *H04N 1/00209* (2013.01); *H04N 1/32053* (2013.01); *H04N 2201/0015* (2013.01); *H04N 2201/0082* (2013.01)

(58) Field of Classification Search
USPC ........................................ 358/1.15
See application file for complete search history.

(56) References Cited

U.S. PATENT DOCUMENTS

| | | | |
|---|---|---|---|
| 2001/0056359 A1 | 12/2001 | Abreu | |
| 2006/0224705 A1* | 10/2006 | Takase | G06F 21/604 709/220 |
| 2008/0205655 A1 | 8/2008 | Wilkins et al. | |
| 2009/0125429 A1 | 5/2009 | Takayama | |
| 2009/0279117 A1* | 11/2009 | Kondo | B41J 29/38 358/1.14 |

(Continued)

FOREIGN PATENT DOCUMENTS

| | | |
|---|---|---|
| JP | 2002-312853 | 10/2002 |
| JP | 2003-030528 | 1/2003 |

(Continued)

*Primary Examiner* — Jerome Grant, II

(57) ABSTRACT

Customers are able to obtain information printed on a receipt without greatly changing the configuration of devices such as POS registers that process product sales. In an information management system 1, a printer 3 prints a receipt based on transaction information related to a product sale; a receipt database 7 stores transaction information relationally to a unique ID 52; an member service server 6 registers unique IDs 52 in the receipt database 7; an NFC reader 45 reads the unique IDs 52; and a control unit 30 determines if a unique ID 52 is registered in the receipt database 7, prints transaction information and access information for accessing the member registration server 62 if the unique ID 52 is not registered, and sends the unique ID 52 and the transaction information to the member service server 6 if the unique ID 52 is registered.

11 Claims, 7 Drawing Sheets

(56) References Cited

U.S. PATENT DOCUMENTS

2012/0095853 A1   4/2012  von Bose et al.
2012/0123806 A1   5/2012  Schumann, Jr. et al.
2013/0299569 A1  11/2013  Gentile et al.
2015/0073890 A1*  3/2015  Nobutani .............. G06Q 20/209
                                                705/14.38

FOREIGN PATENT DOCUMENTS

| JP | 2004-164300 | 6/2004 |
| JP | 2004-185443 | 7/2004 |
| JP | 2005-056143 | 3/2005 |
| JP | 2005-141649 | 6/2005 |
| JP | 2011-090375 | 5/2011 |

* cited by examiner

INFORMATION MANAGEMENT SYSTEM, AND PRINTER

CROSS-REFERENCE TO RELATED APPLICATIONS

This application is a continuation of, and claims priority under 35 U. S. C. §120 on, application Ser. No. 14/385,651, filed Sep. 16, 2014, which is a 371 of international application no. PCT/JP2013/003471, filed Jun. 3, 2013, which claims priority to Japanese Patent Application Nos. 2012-138479, filed Jun. 20, 2012 and 2012-138481, filed Jun. 20, 2012. Each such priority application is hereby expressly incorporated by reference herein in its entirety.

BACKGROUND OF THE INVENTION

Technical Field

The present invention relates to an information management system that processes transaction information related to product sales, and to a printer.

The present application claims priority based on and incorporates by reference the entire contents of Japan Patent No. 2012-138479 filed in Japan on 2012 Jun. 20, and No. 2012-138481 filed on 2012 Jun. 20.

Background

Technology enabling the customer to acquire information printed on a receipt in POS systems that execute sale processes, for example, is known from the literature (see, for example, PTL 1). In the system disclosed in PTL 1, a server computer stores a database of receipt information and an e-mail database storing e-mail addresses used to retrieve the receipt information; and when a POS register installed in a store runs a sale process and prints a receipt, the server computer issues a receipt ID, and generates and sends an e-mail address containing this receipt ID to the POS register. The POS register then prints purchase history information with the e-mail address on the receipt, and the customer can acquire this information using this e-mail address.

PATENT LITERATURE

[PTL 1] JP-A-2004-185443

SUMMARY OF INVENTION

Technical Problem

In order to acquire information printed on a receipt in the system described in PTL 1, the POS register or other device that prints the receipt must be able to get and print information other than the receipt information, such as a receipt ID and e-mail address, from another device. As a result, building the system of the related art described above requires significant modification of the system configuration, including updating POS registers that only perform sales-related processes, for example, or replacing the POS registers. Introducing the technology is therefore not easy.

Solution to Problem

The present invention is directed to solving at least part of the foregoing problem, and can be achieved by the embodiments and examples described below.

A printing device is adapted to communicate with a remote server, a POS terminal, and an external device. The printing device comprises a print unit configured to print a receipt; and a controller configured to acquire identification information from the external device and transaction information from the POS terminal, and to send the transaction information and the identification information to the remote server.

The controller of such a printing device may be configured to access and reference an identification information database in which the identification information is stored.

The controller may be further configured to determine whether the identification information acquired from the external device is stored in the identification information database. If the identification information acquired from the external device is not stored in the identification information database, the controller sends access information to access the remote server to the print unit and controls the print unit to print the receipt based on the access information.

The print unit is preferably configured to print the receipt based on the transaction information.

The controller may be configured to determine whether the identification information is input from the external device during a specific time period after the transaction is input from the POS terminal. If the identification information is not input during the specific time period, the controller controls the print unit to print the receipt based on the transaction information.

Preferably, the identification information database stores a print receipt flag corresponding to the identification information and specifying whether or not to print the receipt.

The controller may be configured to acquire the print receipt flag from the remote server.

The printing device may further comprise a storage unit configured to store the identification information database.

In another arrangement, a control method is provided for a printing device, which is adapted to communicate with a remote server and has a print unit configured to print a receipt, a controller, a POS terminal, and an external device. The control method comprises acquiring customer identification information from the external device and transaction information from the POS terminal; and sending the transaction information and the identification information to the remote server.

The control method may further comprise accessing and referencing an identification information database in which the identification information is stored.

The control method may further comprise determining whether the identification information acquired from the external device is stored in the identification information database. If the identification information acquired from the external device is not stored in the identification information database, sending access information to access the remote server to the print unit and controlling the print unit to print the receipt based on the access information.

Printing the receipt is preferably based on the transaction information.

The control method may further comprise determining whether the identification information is input from the external device during a specific period of time after the transaction information is input from the POS terminal. If the identification information is not input during the specific period of time, printing the receipt based on the transaction information.

Preferably, the identification information database stores a print receipt flag corresponding to the identification information, and the control method further comprises determining whether or not to print the receipt based on the print receipt flag.

The control method may further comprise acquiring the print receipt flag from the remote server.

The invention can be used to build a system that stores information printed on receipts as data and enables customers to retrieve the data without greatly changing the configuration of POS registers or other devices that process transactions related to product sales in a store.

DESCRIPTION OF EMBODIMENTS

Embodiment 1

A first embodiment is described below with reference to the accompanying figures. Note that for convenience of description and illustration, the vertical and horizontal scale of members and parts may differ from the actual in the figures referenced in the description below.

Configuration of an Information Management System

Figure 1:
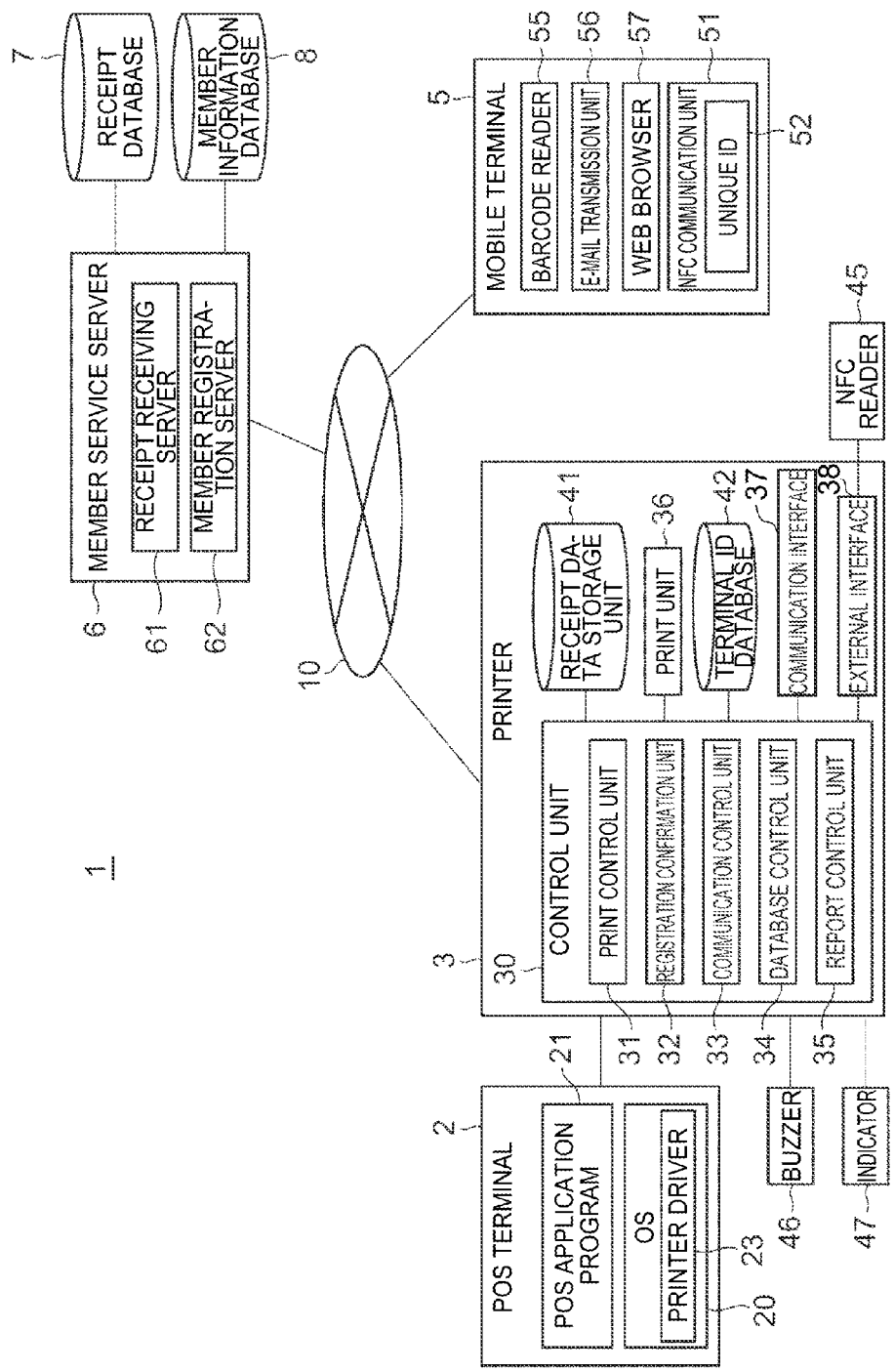
FIG. 1 illustrates the configuration of an information management system according to a first embodiment of the invention.

The configuration of an information management system applying the invention is described with reference to FIG. 1. FIG. 1 shows the configuration of an information management system according to the first embodiment of the invention.

As shown in FIG. 1, the information management system 1 includes a POS terminal 2 and a printer 3 (printing device) embodying an example of a POS system used in a retail store or other business, and a member service server 6 (identification information management device), connected over a communication network 10. The communication network 10 is a communication network deployed over a wide area, such as the Internet, and while the specific configuration thereof is not limited, the communication network 10 may include communication lines such as common carrier or dedicated lines operated by a telecommunication provider, or communication lines including connections operated by a cell phone provider.

The POS terminal 2 includes a barcode reader for registering products that are sold, a key operating unit, a customer display that displays price information for the customer, a cash drawer that holds money, a card reader that reads credit cards and other magnetic stripe cards, and other components not shown in the figure. The main functions of the POS terminal 2 include, for example, tabulating products purchased by customers at the point-of-sale at a check-out counter in a store, displaying the total purchase amount, calculating change due on the amount received, processing credit card purchases, and outputting transaction information for printing a receipt showing the transaction content after completing payment by cash or credit card. The transaction information includes store information such as the name of the store that sold the product, product information such as the name of the sold product, the product category, and the product price, and amount information including the total sale amount, the amount received, and the change due, and this information is output from the POS terminal 2 to the printer 3. Based on the transaction information input from the POS terminal 2, the printer 3 prints on internally stored roll paper (not shown) and issues a receipt.

The POS terminal 2 includes a CPU, ROM, RAM, flash memory, hard disk drive, or other storage device, and controls parts of the POS terminal 2 by the CPU running an OS (operating system) 20. The CPU of the POS terminal 2 also runs an application program 21 on the OS 20, and renders the functions of the POS terminal described above.

A printer driver 23, which is a part of the OS 20, is installed in the POS terminal 2. The printer driver 23 is a device driver program for printing with the printer 3. The printer driver 23 outputs print data and print commands, which are generated by the application program 21 for printing transaction information in a specific format, to the printer 3. The print data output by the printer driver 23 includes predefined information such as the logo of the store where the POS terminal 2 is installed, and transaction information produced by the application program 21.

The printer 3 has a control unit 30 (print control device) including a CPU, ROM, and RAM, and the control unit 30 controls other parts of the printer 3. The printer 3 also has a print unit 36 (print unit) including a printhead and conveyance rollers that prints on roll paper (not shown in the figure); a communication interface 37 that is connected to the communication network 10 and communicates data with the member service server 6 described below through the communication network 10; and an external interface 38 that connects to external devices. The printer 3 has an internal storage device such as flash memory or a hard disk drive, and a receipt data storage unit 41 (storage unit) that temporarily stores transaction information input from the POS terminal 2, and a terminal ID database 42 (printing conditions database) that stores the unique IDs received from the member service server 6 as described below, are stored in the storage space of this storage device.

The control unit 30 controls the print unit 36 based on the print commands and print data input from the POS terminal 2, and has a print control unit 31 (print controller) that prints receipts, a registration confirmation unit (decision unit) 32 (25B in FIG. 7), report control unit 35 (25D in FIG. 7), and control unit (print control device) 30. The printer 3 and the POS terminal 2 together function as a POS system by means of functions of the print control unit 31.

An NFC reader 45 (data acquisition unit) is also connected to the external interface 38 of the printer 3. The NFC reader 45 communicates by near field communication with a contact less IC card or other card-type IC tag, or an IC tag in a mobile terminal 5 or other device, and acquires information stored in the IC tag. The IC tag with which the NFC reader 45 communicates could be an active tag or a passive tag. In the information management system 1 according to this embodiment, the NFC reader 45 reads the unique ID 52 (identification information) from the NFC communication unit 51 (described below) used as a recording medium in a mobile terminal 5 (external terminal device), and outputs the read unique ID 52 through the external interface 38 to the control unit 30.

The printer 3 also has a buzzer 46 and an indicator 47 for reporting to the operator that operates the POS terminal 2. These sound or light as controlled by the control unit 30.

In the information management system 1, the printer 3 sends transaction information recorded on a receipt produced by the printer 3 to the member service server 6, and the member service server 6 can store transaction information for each customer in a receipt database 7 (transaction database, external device). Customers that shopped in the store where the POS terminal 2 is deployed can retrieve transaction information stored in the receipt database 7 by accessing the member service server 6. Customers can retrieve data related to the purchase amount and purchased products at any time, and use this information for asset management using a computer.

The information management system 1 uses the unique ID 52 of the mobile terminal 5 used by the customer as information for identifying the customer.

The mobile terminal 5 is a common cellphone or a mobile device such as a smartphone and has the basic configuration required for voice calls and data communication, that is, a configuration including a microphone, speaker, a communication unit enabling wireless communication with a base station, a display screen, keypad, and battery. The mobile terminal 5 also has a NFC communication unit 51 for near field communication (NFC), and the NFC communication unit 51 has an IC chip that stores the unique ID 52, and communicates wirelessly and reports the unique ID 52 to the reading device when the mobile terminal 5 is within range of a specific reading device (the NFC reader 45 in this example).

The unique ID 52 is identification information that differs for each mobile terminal 5. The unique ID 52 may be an ID that is assigned by the manufacturer or seller of the mobile terminal 5, an ID that is assigned by the entity that operates the information management system 1, an ID that is assigned by some other business entity, or any other value that is not identically stored simultaneously by plural mobile terminals 5.

The mobile terminal 5 also has a barcode reader 55 that images and reads barcodes with an internal camera (not shown in the figure), an e-mail transmission unit 56 that sends e-mail, and a web browser 57 that displays a web page written in HTML or other markup language. By detecting and decoding the code in the captured image, the barcode reader 55 outputs the data from the read barcode. In addition to linear barcodes, the barcode reader 55 also reads QR codes (R) and other two-dimensional code symbols. The e-mail transmission unit 56 has a predetermined e-mail address, and sends e-mail to the specified addressee using this e-mail address. When the barcode reader 55 reads a barcode for sending an e-mail and gets data specifying the e-mail subject and the e-mail address of the recipient, the e-mail transmission unit 56 activates based on the acquired information and can start creating and sending an e-mail. The web browser 57 downloads data for a web page from an external server device through the communication network 10, and displays the web page. When an input field is provided in the displayed web page, the web browser 57 also sends the data input to the input field through the communication network 10 to the specified server.

Management Method of the Information Management System

Figure 2A:
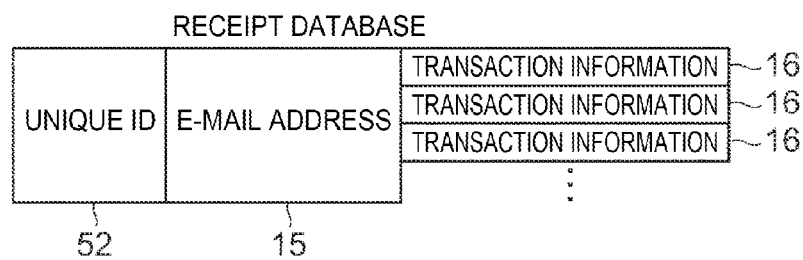
FIG. 2 illustrates the structure of data stored to the databases.
Figure 2B:
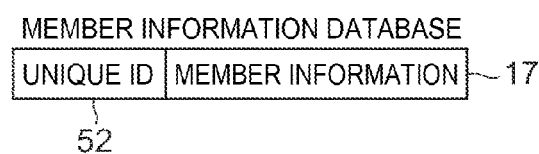
Figure 2C:
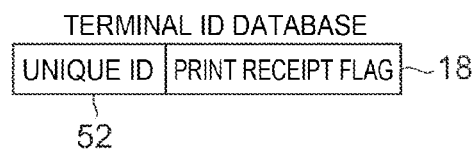
Figure 3:
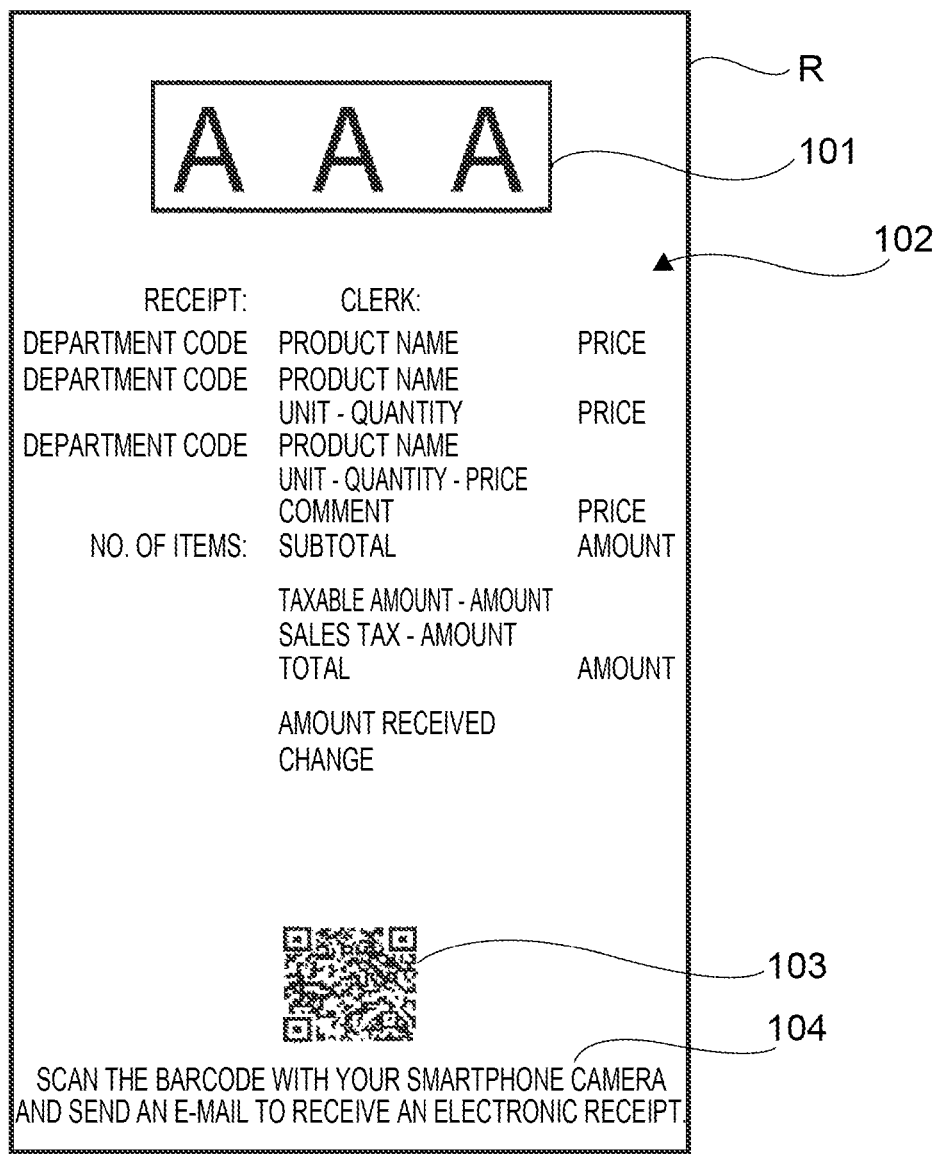
FIG. 3 shows an example of a receipt printed by the printer.

The information management system 1 identifies customers by the unique ID 52 assigned to the mobile terminal 5, and manages transaction information for each customer. The management method of the information management system is described below with reference to FIG. 2 and FIG. 3. FIG. 2 schematically describes information stored in the databases administered by the information management system 1, (A) showing information stored in the receipt database 7, (B) showing information stored in the member information database 8, and (C) showing information stored in the terminal ID database 42. FIG. 3 shows an example of a receipt R that is printed by the printer 3, and has a printed barcode for registering the unique ID 52.

As shown in FIG. 2 (A), the receipt database 7 stores the unique ID 52 of the mobile terminal 5 related to the e-mail address 15 used by the e-mail transmission unit 56 of the mobile terminal 5. Transaction information 16 is stored relationally to the unique ID 52 and e-mail address 15 in the receipt database 7. The receipt database 7 can store plural transaction information 16 records keyed to a specific unique ID 52 and e-mail address 15 set.

As shown in FIG. 2 (B), the unique ID 52 and member information 17 are relationally stored in the member information database 8. The member information 17 is the information input by the customer using the mobile terminal 5 when registering a customer as described below, and may include personal information such as the name, address, age, and sex of the customer, and attribute data.

As shown in FIG. 2 (C), the unique ID 52 is also stored in the terminal ID database 42 (identification information database) of the printer 3. The unique ID 52 stored in the terminal ID database 42 is the unique ID 52 stored in the receipt database 7.

When a unique ID 52 and transaction information are sent from the printer 3, the member service server 6 stores the transaction information in the receipt database 7 relationally to the unique ID 52 already stored in the receipt database 7. If the unique ID 52 is not already stored in the receipt database 7, the transaction information cannot be stored. In other words, storing transaction information in the receipt database 7 is limited to customers who have already been registered as customers using the receipt database 7. Customers using an unregistered unique ID 52 must perform a task that registers the unique ID 52. This registration procedure is described below.

The unique ID 52 registered in the receipt database 7 by a specific procedure is stored in the terminal ID database 42. The printer 3 can know if a particular unique ID 52 is registered by referencing the terminal ID database 42.

A print receipt flag 18 is stored related to each unique ID 52 in the terminal ID database 42. The print receipt flag 18 is information specifying whether or not the printer 3 prints a paper receipt. When the printer 3 gets a unique ID 52 before printing a receipt, the printer 3 reads the print receipt flag 18 stored relationally to the acquired unique ID 52 in the terminal ID database 42. Based on the setting of the print receipt flag 18, the printer 3 determines whether or not to print a receipt.

Note that the terminal ID database 42 used as an identification information database is not limited to being stored in the printer 3 as described in this embodiment, and could be stored in an external storage device connected to the external interface 38 of the printer 3, for example. More specifically, the terminal ID database 42 can be any configuration that can be accessed and referenced more quickly than the receipt database 7 by the control unit 30 of the printer 3. That is, the terminal ID database 42 and the control unit 30 can be connected in any way enabling the control unit 30 to access the terminal ID database 42 and retrieve data more quickly than when accessing a device connected over the communication network 10.

Referring again to FIG. 1, the control unit 30 of the printer 3 also has a registration confirmation unit 32 (decision unit), communication control unit 33 (transmission unit), database control unit 34, and report control unit 35 in addition to the print control unit 31. These parts are embodied by the control unit 30 running a specific program.

When print data from the POS terminal 2 is input and transaction information is included in the print data, the registration confirmation unit 32 determines if a unique ID 52 was acquired by the NFC reader 45. Note that the registration confirmation unit 32 may also determine if transaction information is contained in the print data input from the POS terminal 2, or operate as though registered information is contained in the print data input from the POS terminal 2 without making this determination. In addition, when a unique ID 52 is acquired by the NFC reader 45, the registration confirmation unit 32 determines if the acquired unique ID 52 is stored in the terminal ID database 42.

If the registration confirmation unit 32 determines that the unique ID 52 acquired by the NFC reader 45 is stored in the terminal ID database 42, the communication control unit 33 sends the transaction information and the unique ID 52 through the communication interface 37 to the receipt receiving server 61 of the member service server 6.

If the registration confirmation unit 32 determines that the unique ID 52 acquired by the NFC reader 45 is not stored in the terminal ID database 42, the print control unit 31 prints the transaction information input from the POS terminal 2 together with a barcode for the customer using the mobile terminal 5 to register the unique ID 52 on the receipt.

Transaction information 102 and a logo 101 for the store where the POS terminal 2 is deployed are printed, and a barcode 103 and instructions 104 for registering the unique ID 52 using the barcode 103 are printed, on the receipt R shown in FIG. 3. The barcode 103 encodes, for example, information for creating an e-mail with the mobile terminal 5 in a format that can be read by the barcode reader 55 of the mobile terminal 5. The barcode 103 could be a linear barcode or a QR code (R) or other two-dimensional barcode. The information contained in the barcode 103 includes the e-mail address of the addressee, and information that is input to the title (subject) and main text (body) of the e-mail. When a barcode 103 is read with the barcode reader 55, the mobile terminal 5 can create and send an e-mail based on the information contained in the barcode 103 to the e-mail address specified by the barcode 103 by a function of the e-mail transmission unit 56. The e-mail address contained in the barcode 103 is the e-mail address of the member service server 6 stored by the member service server 6. The unique ID 52 is registered as described below as a result of the mobile terminal 5 sending this e-mail to the member service server 6.

The unique ID 52 acquired by the NFC reader 45 may also be contained in the barcode 103. Because the unique ID 52 is contained in the e-mail sent by the mobile terminal 5 based on the barcode 103, the member service server 6 can easily acquire the unique ID 52. In addition, if including the actual unique ID 52 in the barcode 103 must be avoided, information for acquiring the unique ID 52 from an external server (not shown in the figure) that manages the unique IDs 52 could be included in the barcode 103.

When the registration confirmation unit 32 determines that the unique ID 52 acquired by the NFC reader 45 is stored in the terminal ID database 42, the print control unit 31 references the value of the print receipt flag 18 stored in the terminal ID database 42. When the print receipt flag 18 is set to print a receipt, the print control unit 31 prints a paper receipt with the print unit 36. The receipt printed in this instance is, for example, the receipt R shown in FIG. 3 without the barcode 103 and instructions 104. When the print receipt flag 18 is set to not print a receipt, the print control unit 31 does not print a receipt.

When a unique ID 52 is registered in the receipt database 7 by the procedure described below, and the registered unique ID 52 is then sent from the member registration server 62, the database (DB) control unit 34 receives and stores the unique ID 52 in the terminal ID database 42. When the unique ID 52 and the value of the print receipt flag 18 are sent from the member service server 6, the database control unit 34 relationally stores this value with the unique ID 52 in the terminal ID database 42.

When the print control unit 31 does not print a receipt based on the value of the print receipt flag 18 in the terminal ID database 42, the report control unit 35 sounds the buzzer 46 and lights the indicator 47.

The member service server 6 is a server that exchanges data with the printer 3 and mobile terminal 5 through the communication network 10, and has a receipt receiving server 61 and a member registration server 62. The member service server 6 also stores the receipt database 7 and member information database 8 described above.

The member service server 6, receipt database 7, and member information database 8 can be configured as desired. The receipt receiving server 61 and member registration server 62 may be servers rendered virtually on the single member service server 6, or if the member service server 6 consists of plural separate servers, the receipt receiving server 61 and member registration server 62 could be rendered as separate individual servers. This also applies to the receipt database 7 and member information database 8, with storage areas functioning as the receipt database 7 and member information database 8 reserved virtually in the storage device storing the member service server 6, or a database server that functions as the receipt database 7 and member information database 8 disposed separately from the member service server 6.

The receipt receiving server 61 receives the unique ID 52 and transaction information sent from the printer 3, and relationally stores the unique ID 52 with the transaction information in the receipt database 7. The receipt receiving server 61 has a URL (Uniform Resource Locator) that receives access requests from mobile terminals 5, and when accessed by the web browser 57 of the mobile terminal 5 specifying that URL, sends data for a member service web page to the mobile terminal 5. Note that a member as used here denotes a customer registered by a unique ID 52 in the receipt database 7.

When data is input to a web page the receipt receiving server 61 sent to the web browser 57 and that data is sent from the web browser 57, the receipt receiving server 61 receives the data. When a transaction information request is contained in the received data, the receipt receiving server 61 reads the transaction information from the receipt database 7 in response to the request, and generates and sends a web page containing the read transaction information to the mobile terminal 5. The customer operating the mobile terminal 5 can then view a record of their own purchases by the web browser 57 displaying the web page sent from the receipt receiving server 61.

The member registration server 62 executes a process that registers the unique ID 52 in the receipt database 7 and member information database 8. The member registration server 62 has an e-mail address for sending and receiving e-mail, and a URL for access from the mobile terminal 5.

The member registration server 62 receives e-mail sent from the mobile terminal 5, and sends e-mail containing the URL for registration to the e-mail address of the sender of the e-mail. If the web browser 57 of the mobile terminal 5 specifies the registration URL and accesses the server, the member registration server 62 sends data for the registration page to the mobile terminal 5. When data is then input to the web page sent to the web browser 57 and this data is sent from the web browser 57, the member registration server 62 receives the data. The member registration server 62 then extracts the unique ID 52 and the personal information and attributes of the member from the received data and registers the extracted information in the member information database 8. The member registration server 62 then sends the registered unique ID 52 to the printer 3. If information specifying whether or not to print a receipt is contained in the dat received from the mobile terminal 5, the member registration server 62 determines the setting of the print receipt flag 18 based on this information and outputs the setting with the unique ID 52 to the printer 3.

Operation of the Information Management System

Figure 4:
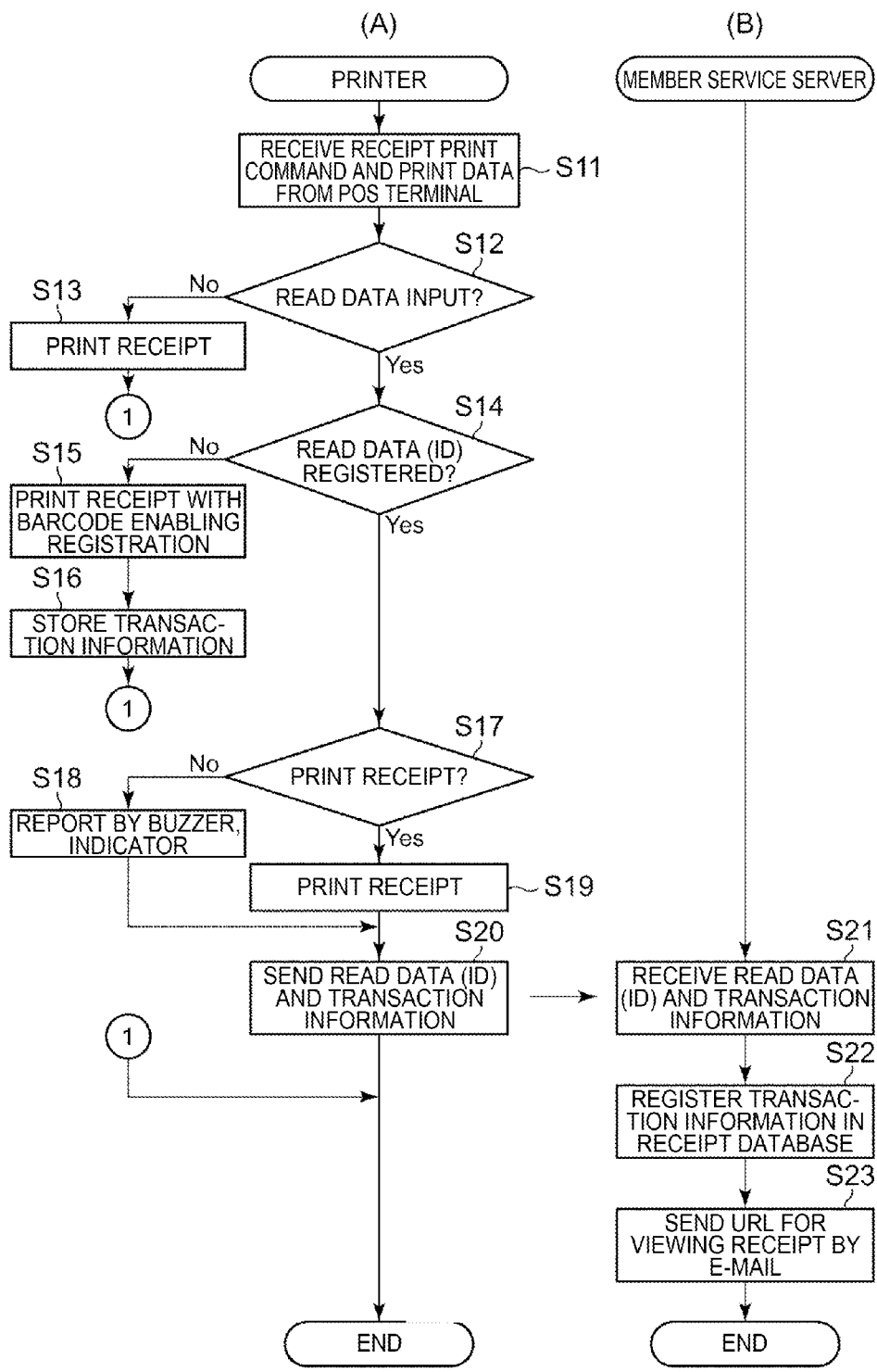
FIG. 4 is a flow chart describing the operation of the information management system.

The operation of the information management system is described next with reference to FIG. 4 to FIG. 6. FIG. 4 is a flow chart showing the operation of the information management system, particularly the operation when a transaction related to a product sale is executed by the POS terminal 2. In FIG. 4, (A) denotes the operation of the printer 3, and (B) denotes the operation of the member service server 6.

As shown in FIG. 4, when the control unit 30 of the printer 3 receives print data and a print command instructing printing a receipt from the POS terminal 2 (step S11), the control unit 30 determines if read data was input from the NFC reader 45 (step S12). If read data from the NFC reader 45 is not input within a predetermined specific time (step S12 returns NO), the print control unit 31 controls the print unit 36 to print a receipt (step S13), and ends this process.

When a unique ID 52 is read and the read data is input to the NFC reader 45 by communication between the NFC reader 45 and the NFC communication unit 51 of the mobile terminal 5 (step S12 returns YES), the registration confirmation unit 32 determines if the unique ID 52 is already registered based on whether or not the input unique ID 52 is stored in the terminal ID database 42 (step S14). If the unique ID 52 is not registered (step S14 returns NO), the print control unit 31 prints a receipt (such as receipt R shown in FIG. 3) with a barcode (such as barcode 103 in FIG. 3) containing the e-mail address for sending the registration e-mail to the member registration server 62, and the subject and any text to include in the body of the e-mail (step S15). The unique ID 52 acquired by the NFC reader 45, or information for acquiring the unique ID 52 from a separate server device, could be included in the barcode printed on the receipt.

The registration confirmation unit 32 then stores the registration information printed on the receipt related to the unique ID 52 input from the NFC reader 45 in the receipt data storage unit 41 (step S16), and ends this process.

If the unique ID 52 input from the NFC reader 45 is already registered (step S14 returns YES), the print control unit 31 reads the print receipt flag 18 stored in the terminal ID database 42 and determines whether or not to print a receipt (step S17). If a receipt is not to be printed (step S17 returns NO), the report control unit 35 sounds the buzzer 46 and turns on the indicator 47 to inform the operator (step S18), and then goes to step S20. If a receipt is to be printed (step S17 returns YES), the print control unit 31 prints a normal receipt printed with the transaction information by the print unit 36 (step S19), and then goes to step S20.

In step S20, the communication control unit 33 sends the unique ID 52 input from the NFC reader 45 with the transaction information to the receipt receiving server 61.

The receipt receiving server 61 of the member service server 6 receives the transaction information and unique ID 52 sent from the printer 3 (step S21), and stores the received transaction information related to the unique ID 52 in the receipt database 7 (step S22). In addition, the receipt receiving server 61 sends an e-mail containing a URL for viewing and retrieving transaction information in the receipt database 7 to the e-mail address stored in the receipt database 7 for the unique ID 52, and then ends this process.

Figure 5:
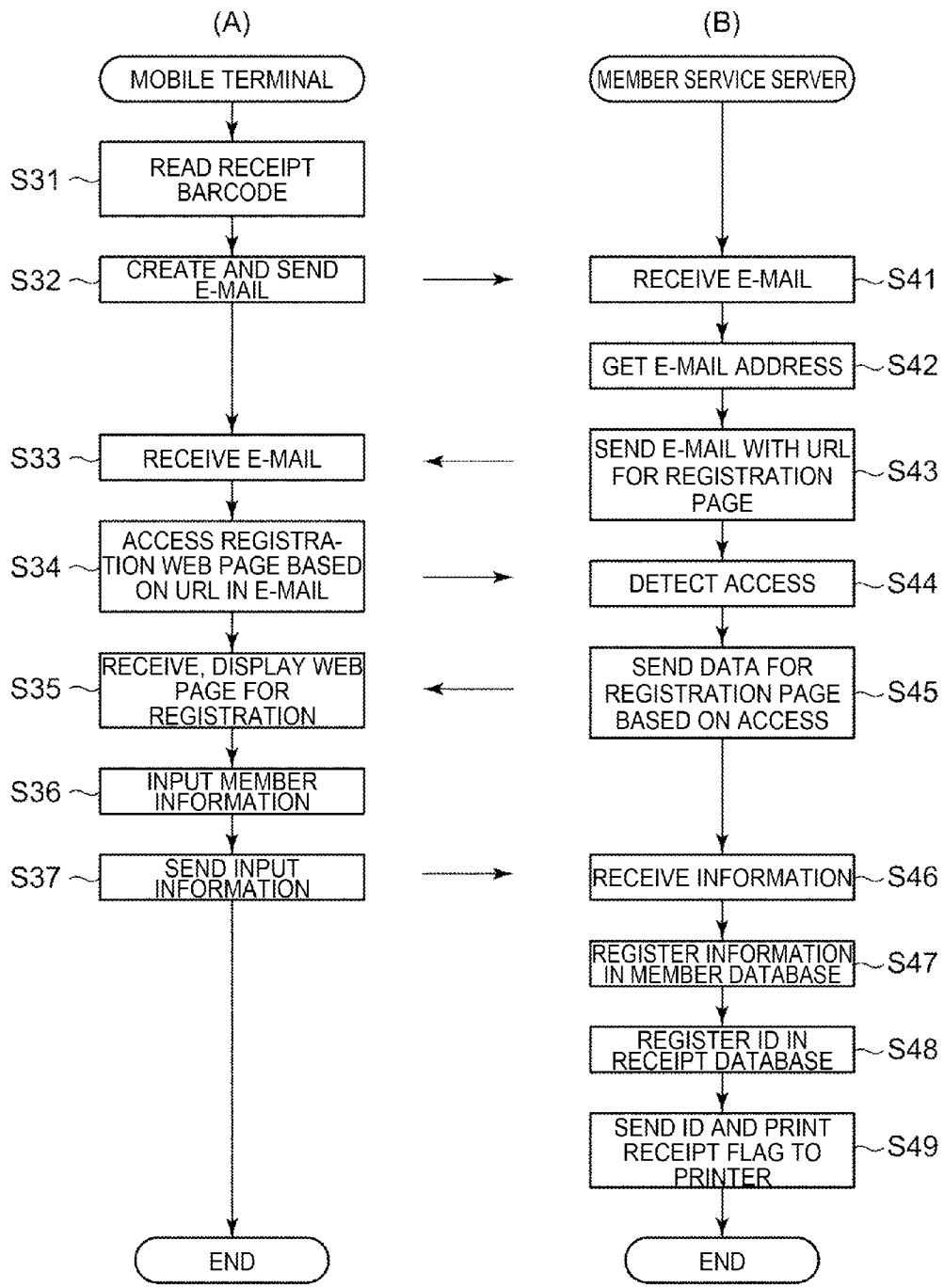
FIG. 5 is a flow chart describing the operation of the information management system.

FIG. 5 is a flowchart of the operation of the information management system 1, showing particularly the operation when registering a unique ID 52 in the receipt database 7. In FIG. 5, (A) shows the operation of the mobile terminal 5, and (B) shows the operation of the member service server 6. The operation shown in FIG. 5 is executed using the receipt printed in step S15 in FIG. 4 (A).

As shown in FIG. 5, a customer that wants to register operates the mobile terminal 5 to read the barcode printed on the receipt with the barcode reader 55 (step S31), and the e-mail transmission unit 56 creates and sends an e-mail based on information contained in the barcode (step S32). The e-mail created by the e-mail transmission unit 56 could be an empty e-mail message containing only the information contained in the barcode on the receipt, and not containing any information input by input operations of the customer.

The member registration server 62 of the member service server 6 then receives the e-mail sent from the mobile terminal 5 (step S41 in FIG. 4 (B)), gets the e-mail address of the sender of the e-mail (step S42), and sends an e-mail containing a URL for accessing the registration web page to the e-mail address of the sender (step S43).

When the mobile terminal 5 receives the e-mail sent by the member registration server 62 (step S33), the web browser 57 accesses the member registration server 62 based on the URL contained in the received e-mail (step S34).

The member registration server 62 detects access by the mobile terminal 5 (step S44), and sends the data for the registration page to the mobile terminal 5 (step S45). The web browser 57 of the mobile terminal 5 thus receives and displays the web page sent from the member registration server 62 (step S35). This web page has, for example, fields for inputting the customer's name, address, age, sex, or other personal information and attributes, and an input field for specifying whether or not to print a receipt even when the transaction information is stored in the receipt database 7. If the customer operates the mobile terminal 5 and inputs information based on the web page (step S36), the web browser 57 sends the information input to the input fields of the web page to the member registration server 62 (step S37).

The member registration server 62 receives the information sent from the mobile terminal 5 (step S46), and based on the received information relationally stores the unique ID 52 and member information 17 in the member information database 8 (step S47), and registers the unique ID 52 in the receipt database 7 (step S48). The unique ID 52 may also be input to an input field of the web page on the mobile terminal 5. If the unique ID 52 is contained in the e-mail sent by the mobile terminal 5 in step S32, the member registration server 62 could acquire the unique ID 52 with the e-mail address. The e-mail address acquired in step S42 could also be stored in the receipt database 7 in step S48.

The member registration server 62 then sends the unique ID 52 registered in the receipt database 7, and the value of the print receipt flag 18 generated based on information sent from the mobile terminal 5, to the printer 3 (step S49), and ends this process.

Figure 6:
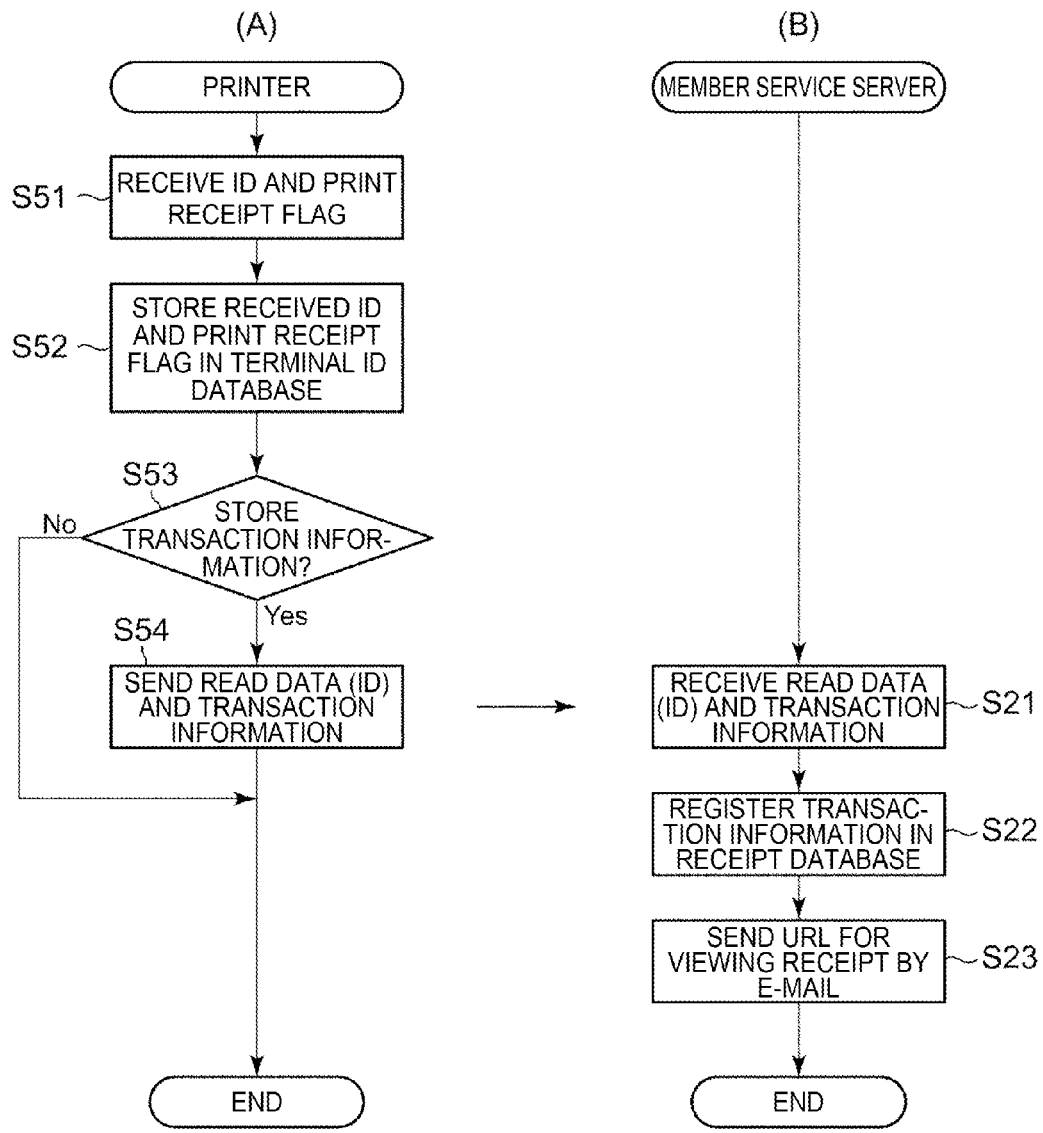
FIG. 6 is a flow chart describing the operation of the information management system.

FIG. 6 is a flowchart of the operation of the information management system 1, showing particularly the operation after a unique ID 52 is registered in the receipt database 7. In FIG. 6, (A) shows the operation of the printer 3, and (B) shows the operation of the member service server 6. The operation shown in FIG. 6 is executed after step S49 in FIG. 5 (B).

As shown in FIG. 6, the communication control unit 33 of the printer 3 receives the unique ID 52 and the value of the print receipt flag 18 that were sent by the member registration server 62 (step S51), and the database control unit 34 saves the received unique ID 52 and the setting of the print receipt flag 18 in the terminal ID database 42 (step S52). The communication control unit 33 then determines if transaction information corresponding to the received unique ID 52 is stored in the receipt data storage unit 41 (step S53). Transaction information corresponding to an unregistered unique ID 52 is stored in the receipt data storage unit 41 in step S16 in FIG. 4 (A). If such transaction information is stored (step S53 returns YES), the communication control unit 33 reads the transaction information from the receipt data storage unit 41 and sends the transaction information with a link to the unique ID 52 to the member service server 6 (step S54).

Note that the transaction information stored in the receipt data storage unit 41 is deleted after being sent to the member service server 6 in step S54, or after a specific time has past.

When the printer 3 sends the transaction information to the receipt receiving server 61 in step S54 in FIG. 6 (A), the receipt receiving server 61 executes steps S21 to S23 in FIG. 4 (B).

As described above, when a customer for which a unique ID 52 is not registered in the receipt database 7 uses the POS terminal 2 and performs the registration operation shown in FIG. 5 based on the printed receipt R, the transaction information already printed on the receipt is stored in the receipt database 7. As a result, when the customer wants to use the receipt database 7 as a member, the transaction information at that time can be stored in the receipt database 7 and user convenience can be improved.

As described above, an information management system 1 according to the first embodiment of the invention includes a printer 3 with a print unit 36 that prints receipts based on transaction information related to product sales; a receipt database 7 that stores transaction information related to a registered unique ID 52; and a member service server 6 with a member registration server 62 that registers the unique ID 52 in the receipt database 7 according to access from the mobile terminal 5. The printer 3 has an NFC reader 45 that reads the unique ID 52 of a mobile terminal 5, a registration confirmation unit 32 that determines if a unique ID 52 acquired by an NFC reader 45 is registered in the receipt database 7, and a control unit 30.

The control unit 30 includes a print control unit 31 and communication control unit 33. When an acquired unique ID 52 is not registered in the receipt database 7, the print control unit 31 controls the print unit 36 to print the transaction information and access information for accessing the member registration server 62. When the acquired unique ID 52 is registered in the receipt database 7, the communication control unit 33 sends the unique ID 52 linked to the transaction information to the member service server 6.

As a result, the printer 3 gets the unique ID 52 recorded in the mobile terminal 5 used by the customer, and if this unique ID 52 is already registered, sends the transaction information, which is the information printed on the receipt, to the receipt database 7. The transaction information can therefore be stored in the database using the print data output by the POS terminal 2. If the unique ID 52 is not registered, a barcode providing access information is printed with the transaction information on the receipt. Customers can therefore be prompted to register the unique ID 52, and the convenience of customers that want to register their unique ID 52 can be improved. As a result, the POS terminal 2 does not need to be provided with functions for executing a registration process when a customer wants to register, and executing a process for storing the transaction information in the receipt database 7. Therefore, a system that stores transaction information as data and enables customers to retrieve the transaction information can be achieved without changing the configuration of existing POS terminals 2.

Because the printer 3 connected to the POS terminal 2 in this configuration has an NFC reader 45, a registration confirmation unit 32, a print control unit 31, and a database control unit 34, the transaction information can be stored in the receipt database 7, and the customer can be enabled to retrieve the transaction information, if the POS terminal 2 outputs print data containing transaction information in the same way as when printing a normal receipt.

Furthermore, because the control unit 30 functioning as a print control device acquires the unique ID 52 with an NFC reader 45 each time transaction information is input from the POS terminal 2, the transaction information can be processed based on the unique ID 52 each time a transaction related to a product sale is executed. A normal POS terminal 2 can therefore also process the transaction information at the same timing a receipt is issued.

The control unit 30 stores the acquired unique ID 52 and the transaction information in the receipt data storage unit 41 when the unique ID 52 acquired by the NFC reader 45 is not registered in the receipt database 7, and when the unique ID 52 is registered in the receipt database 7, the control unit 30 sends the unique ID 52 and the transaction information stored in the receipt data storage unit 41 to the receipt database 7. As a result, when an unregistered customer registers in the receipt database 7 after completing a transaction related to a product sale, the transaction information can be retroactively stored in the receipt database 7.

The printer 3 also has a terminal ID database 42 that stores the unique IDs 52 registered in the receipt database 7, and by referencing the terminal ID database 42, the registration confirmation unit 32 can quickly determine whether or not the unique ID 52 acquired by the NFC reader 45 is registered in the receipt database 7, and can shorten the time required to issue a receipt.

Because the member registration server 62 acquires the e-mail address used by the mobile terminal 5 and the unique ID 52 from the mobile terminal 5, a URL for viewing transaction information in the receipt database 7 can be sent by e-mail, and marketing and incentives can be communicated by e-mail to customers using an NFC communication unit 51 with a unique ID 52 that has been registered.

An information management system 1 according to the first embodiment of the invention includes a printer 3 with a print unit 36 that prints receipts based on transaction information related to product sales; a receipt database 7 that stores transaction information related to a registered unique ID 52; and a member service server 6 with a member registration server 62 that registers the unique ID 52 in the receipt database 7 according to access from the mobile terminal 5. The printer 3 has a terminal ID database 42 that stores a print receipt flag 18, which is information related to whether or not to print a receipt, related to each unique ID 52 registered in the receipt database 7; an NFC reader 45 that reads the unique ID 52 of a mobile terminal 5; a registration confirmation unit 32 that determines if a unique ID 52 acquired by an NFC reader 45 is registered in the receipt database 7, and a control unit 30.

The control unit 30 includes a communication control unit 33 and a print control unit 31. When the acquired unique ID 52 is registered in the receipt database 7, the communication control unit 33 sends the unique ID 52 linked to the transaction information to the member service server 6. When an acquired unique ID 52 is registered in the receipt database 7, the print control unit 31 controls the print unit 36 to print a receipt based on the print receipt flag 18 stored in the terminal ID database 42.

As a result, the printer 3 gets the unique ID 52 recorded in the mobile terminal 5 used by the customer, and if this unique ID 52 is already registered, sends the transaction information, which is the information printed on the receipt, to the receipt database 7. The transaction information can therefore be stored in the database using the print data output by the POS terminal 2. As a result, the POS terminal 2 does not need to be provided with functions for executing a registration process when a customer wants to register, and executing a process for storing the transaction information in the receipt database 7. For customers using a registered unique ID 52, transaction information can therefore be stored in the receipt database 7 and printing receipts can be controlled based on the print receipt flag 18. Customers can therefore use transaction information data and printed receipts as desired. A system that acquires transaction information as data, and enables customers to use the transaction information data and printed receipts as desired, can therefore can be achieved without changing the configuration of existing POS terminals 2.

Furthermore, because the print control unit 31 can print access information for accessing the member registration server 62 and transaction information with the print unit 36 when the acquired unique ID 52 has not been registered in the receipt database 7, customers can be prompted to register the unique ID 52 when a unique ID 52 is not registered, and the convenience of customers that want to register their unique ID 52 can be improved.

The terminal ID database 42 is connected to the control unit 30 of the printer 3, and the print receipt flag 18 is relationally stored with the unique ID 52 in the terminal ID database 42. By referencing the terminal ID database 42, the registration confirmation unit 32 can determine if the unique ID 52 acquired by the NFC reader 45 is registered in the receipt database 7, and whether or not to print a receipt for the registered unique ID 52, more quickly than when accessing the receipt database 7. The time required to produce a receipt can therefore be shortened.

In the information management system 1 according to the first embodiment of the invention, the printer 3 connected to the POS terminal 2 is configured with functions for printing a barcode for registering a unique ID 52, printing receipts, and transmitting the transaction information and unique ID 52, but the invention is not so limited, and the functions described above can be embodied by the POS terminal 2 or another device connected to the POS terminal 2. An example of such a configuration is described below as the second embodiment.

Embodiment 2

Figure 7:
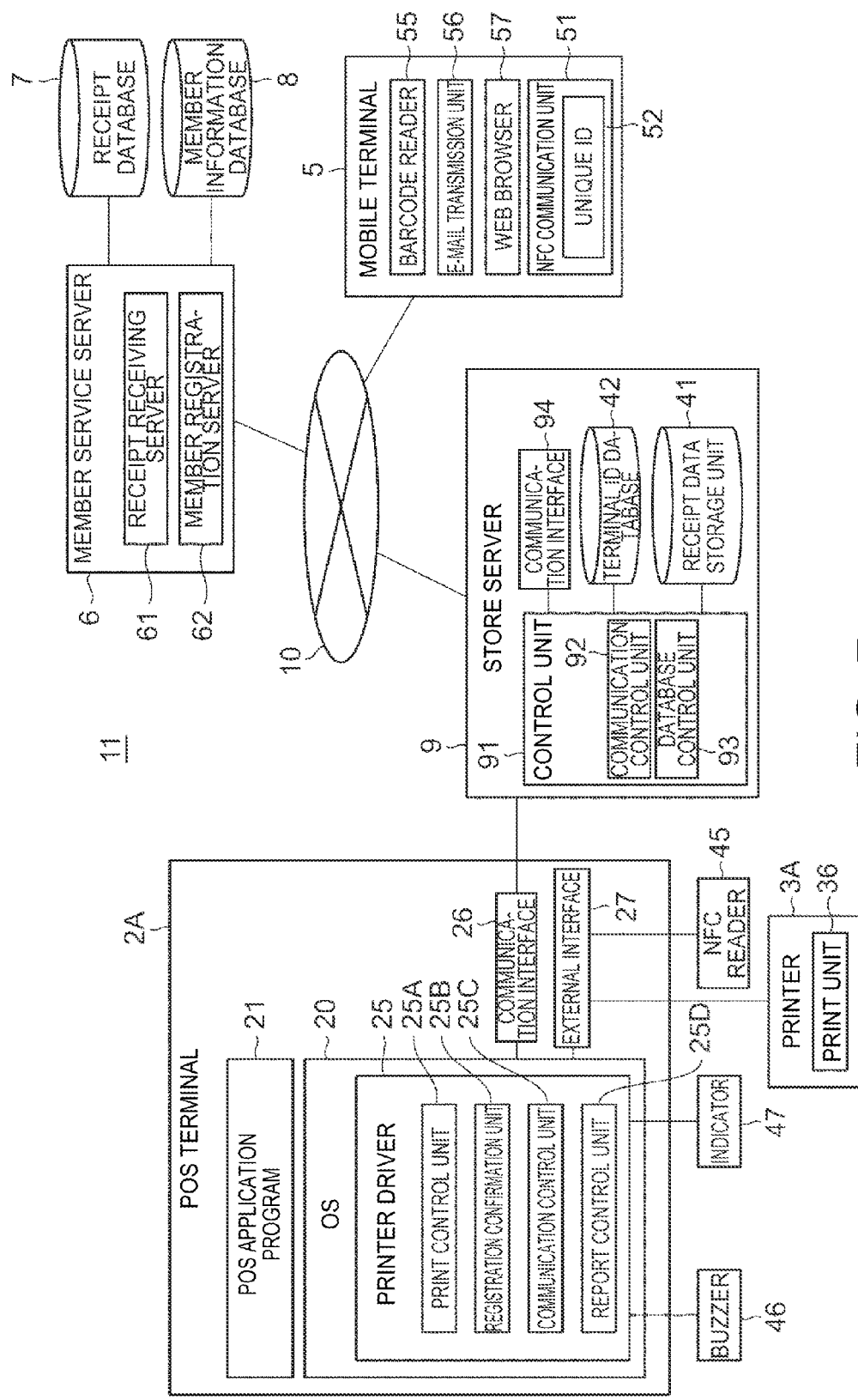
FIG. 7 illustrates the configuration of an information management system according to a second embodiment of the invention.

A second embodiment of the invention is described below with reference to FIG. 7. FIG. 7 illustrates the configuration of the information management system 11 according to the second embodiment of the invention. Note that the same reference numerals are used and further description of configurations and content that are the same as in the first embodiment is omitted below.

As shown in FIG. 7, this information management system 11 has a POS terminal 2A and printer 3A (printing device) instead of the POS terminal 2 and printer 3 in the above information management system 1, has a store server 9 installed in the store where the POS terminal 2A is installed, and communicatively connects the store server 9 to the member service server 6 through the communication network 10. The printer driver 25 (print control device) that is part of the OS 20 of the POS terminal 2A has the functions of the control unit 30 (FIG. 1). The POS terminal 2A also has a communication interface 26 for communicating with the store server 9, and an external interface 27 to which external devices connect. The NFC reader 45, buzzer 46, indicator 47, and printer 3A are connected to the external interface 27, and the printer 3A includes a print unit 36.

The printer driver 25 includes a print control unit 25A (print controller) that prints by the printer 3A, a control unit 30 (print control device), and a registration confirmation unit 25B (decision unit) that determines whether or not the unique ID 52 read by the NFC reader 45 is registered. The printer driver 25 also includes a communication control unit 25C that sends transaction information and the unique ID 52 to the store server 9, and a report control unit 25D that sounds the buzzer 46 and lights the indicator 47 to announce when the print control unit 25A does not print a receipt.

The store server 9 is also communicatively connected by Ethernet (R) to the POS terminal 2A, receives transaction information sent by the POS terminal 2A, and executes transaction information processes. The store server 9 has the receipt data storage unit 41 and terminal ID database 42 described above, a communication interface 94 to which the member service server 6 connects through the communication network 10, and a control unit 91 that controls other parts. The control unit 91 includes a communication control unit 92 (transmission unit) that sends and receives data with the POS terminal 2A and the member service server 6, and a database control unit 93 that manages information stored in the receipt data storage unit 41 and the terminal ID database 42.

A customer that shopped in a store where the POS terminal 2 is installed can retrieve transaction information stored in the receipt database 7 by accessing the member service server 6 in the information management system 11 in the same way as described in the first embodiment above.

In addition, the POS terminal 2A of the information management system 11 sends the transaction information recorded on a receipt produced by the printer 3 to the store server 9, and the store server 9 sends the transaction information to the member service server 6. As a result, the member service server 6 stores individually by customer in the receipt database 7.

When the POS application program 21 of the POS terminal 2A instructs printing and outputs transaction information, the registration confirmation unit 25B of the printer driver 25 determines if a unique ID 52 was acquired by the NFC reader 45. If a unique ID 52 was acquired by the NFC reader 45, the registration confirmation unit 25B sends the acquired unique ID 52 to the store server 9.

The control unit 91 of the store server 9 then determines if the unique ID 52 sent from the POS terminal 2A is stored in the terminal ID database 42, and sends the result of this decision to the POS terminal 2A. The registration confirmation unit 25B gets the decision sent from the store server 9, and notifies the print control unit 25A.

If the unique ID 52 sent from the POS terminal 2 is stored in the terminal ID database 42, the store server 9 reads and sends the setting of the print receipt flag 18 related to that unique ID 52 to the POS terminal 2A.

If the unique ID 52 sent from the POS terminal 2 is stored in the terminal ID database 42, the control unit 91 also sends the unique ID 52 and the transaction information sent from the POS terminal 2A to the member service server 6 and stores it in the receipt database 7.

If the unique ID 52 sent from the POS terminal 2 is not stored in the terminal ID database 42, the control unit 91 stores the unique ID 52 and the transaction information sent from the POS terminal 2A in the receipt data storage unit 41.

When the POS application program 21 of the POS terminal 2A instructs printing and outputs transaction information, the print control unit 25A executes an operation based on the transaction information.

More specifically, when transaction information is input and a unique ID 52 was read by the NFC reader 45, the print control unit 25A sends the transaction information output by the POS application program 21 by means of the communication control unit 25C to the store server 9.

When the setting of the print receipt flag 18 from the store server 9 is sent, and the setting of the print receipt flag 18 indicates to not print a receipt, the print control unit 25A does not output a print command and print data to the printer 3A. In this event, the report control unit 25D sounds the buzzer 46, lights the indicator 47, and informs the operator of the POS terminal 2A that a receipt will not be printed.

If the store server 9 determines the unique ID 52 acquired by the NFC reader 45 is not stored in the terminal ID database 42, the print control unit 25A prints the transaction information input from the POS application program 21 together with a barcode for the customer using the mobile terminal 5 to register the unique ID 52 on the receipt. The receipt printed in this event has a barcode 103 and instructions 104 printed as shown in the receipt R in FIG. 3, for example.

In addition, if a unique ID 52 could not be read by the NFC reader 45, the print control unit 25A generates and outputs a print command and print data for printing the transaction information input from the POS application program 21 to the printer 3A, and prints a receipt.

As in the information management system 1 according to the first embodiment of the invention described above, the mobile terminal 5 used by a customer can access the member service server 6 and register the unique ID 52 in this information management system 11 by the customer using the mobile terminal 5 to read the barcode printed on the receipt. When a unique ID 52 is newly registered in the receipt database 7, the member service server 6 sends the registered unique ID 52 and the setting of the print receipt flag 18 to the store server 9.

The database control unit 93 of the store server 9 stores the unique ID 52 and print receipt flag 18 setting sent from the member service server 6 in the terminal ID database 42.

When a unique ID 52 is registered in the receipt database 7 by the member service server 6, and a registered unique ID 52 is sent from the member service server 6, the database (DB) control unit 93 receives and stores the unique ID 52 in the terminal ID database 42.

When the setting of the print receipt flag 18 is sent with a newly registered unique ID 52 from the member service server 6, the database control unit 93 stores the flag setting relationally to the unique ID 52 in the terminal ID database 42.

When the setting of the print receipt flag 18 is sent with a newly registered unique ID 52 from the member service server 6, and there is transaction information stored relationally to the unique ID 52 in the receipt data storage unit 41, the database control unit 93 sends the transaction information to the member service server 6 and stores it in the receipt database 7.

The information management system 11 thus comprised executes the operations shown in FIG. 4 to FIG. 6 in the same way as the information management system 1, registers the unique ID 52 stored in the mobile terminal 5 used by a customer in the receipt database 7 and member information database 8, stores transaction information in the receipt database 7, and enables the customer to use the transaction information. In other words, the same effect as the information management system 1 can be achieved.

If a customer wishes to register in this information management system 11, registration can be easily completed by the mobile terminal 5 sending an e-mail based on the barcode printed on a receipt.

This information management system 11 embodies the function of the control unit 30 in the first embodiment in the printer driver 25 of the POS terminal 2A. This configuration can process transaction information without changing the POS application program 21 of the POS terminal 2A. Therefore, if the printer driver 25 can be changed, such as when the OS 20 of the POS terminal 2A is the operating system of a common computer, a system that provides transaction information to customers can be built using an existing POS terminal 2A.

Furthermore, by using a store server 9, the POS terminal 2A does not communicate directly with the member service server 6, and there is no effect on the operation of the POS application program 21. Yet further, the store server 9 can be used as a server device that is connected to plural POS terminals 2A, collects transaction information from the plural POS terminals 2A, and manages sales.

The foregoing embodiments describe examples that use the invention, but the invention is not limited to these embodiments. For example, each of the foregoing embodiments is configured to report when a receipt is not printed by the buzzer 46 and indicator 47, but configurations using only the buzzer 46 or the indicator 47 are conceivable, and reports can be issued by other methods such as displaying a message on the display screen of the printer 3 or POS terminal 2A.

The mobile terminal 5 in the foregoing embodiments has a NFC communication unit 51, and this NFC communication unit 51 is described as storing the unique ID 52, but a configuration that reads the unique ID from the card-like storage medium when the customer has a card-like storage medium that uses NFC is also conceivable. If the unique ID or information for acquiring a unique ID is included in the barcode printed on the receipt in this configuration, the operation described above can be executed using a mobile terminal 5 that does not store a unique ID 52. The printing method of the print unit 36 in the printer 3 or printer 3A, and other detailed aspects of the specific configuration can obviously be changed as desired.

INDUSTRIAL APPLICABILITY

As described above, the invention is useful in an information management system that processes transaction information related to product sales, and can be used to build an information management system that can improve the convenience of customers and management of transaction information without greatly changing the configuration of existing printers in a store, for example.

REFERENCE SIGNS LIST 1, 11 information management system
2, 2A POS terminal
3, 3A printer (printing device)
5 mobile terminal (external terminal device)
6 member service server (identification information management device)
7 receipt database (transaction database, external device)
8 member information database
9 store server
18 print receipt flag
23 printer driver
25 printer driver (print control device)
25A, 31 print control unit (print control means)
25B, 32 registration confirmation unit (decision unit)
25C communication control unit
25D, 30 control unit (print control device)
33, 92 communication control unit (transmission unit)
34 database control unit
35 report control unit
36 print unit (print unit)
41 receipt data storage unit (storage unit)
42 terminal ID database (identification information database)
45 NFC reader (information acquisition unit)
46 buzzer
47 indicator
51 NFC communication unit (recording medium)
52 unique ID (identification information)
55 barcode reader
56 e-mail transmission unit
57 web browser
61 receipt receiving server
62 member registration server
91 control unit
93 database control unit
103 barcode
104 instructions
R receipt

The invention claimed is:

1. A printing device adapted to communicate with a remote server, a POS terminal, and an external device, the printing device comprising:
a print unit configured to print a receipt; and
a controller configured to acquire identification information from the external device and transaction information from the POS terminal, and to send the transaction information and the identification information to the remote server, wherein
the controller is configured to access and reference an identification information database in which the identification information is stored and to determine whether the identification information acquired from the external device is stored in the identification information database, and
if the identification information acquired from the external device is not stored in the identification information database, the controller sends access information to access the remote server to the print unit and controls the print unit to print the receipt based on the access information.

2. The printing device described in claim 1, wherein
the print unit is configured to print the receipt based on the transaction information.

3. The printing device described in claim 1, wherein
the controller is configured to determine whether the identification information is input from the external device during a specific time period after the transaction is input from the POS terminal, and
if the identification information is not input during the specific time period, the controller controls the print unit to print the receipt based on the transaction information.

4. The printing device described in claim 1, wherein
the identification information database stores a print receipt flag corresponding to the identification information and specifying whether or not to print the receipt.

5. The printing device described in claim 4, wherein
the controller is configured to acquire the print receipt flag from the remote server.

6. The printing device described in claim 5, further comprising:
a storage unit configured to store the identification information database.

7. A control method for a printing device adapted to communicate with a remote server and having a print unit configured to print a receipt, a controller, a POS terminal, and an external device, the control method comprising:
acquiring customer identification information from the external device and transaction information from the POS terminal;
sending the transaction information and the identification information to the remote server;
accessing and referencing an identification information database in which the identification information is stored; and
determining whether the identification information acquired from the external device is stored in the identification information database, and
if the identification information acquired from the external device is not stored in the identification information database, sending access information to access the remote server to the print unit and controlling the print unit to print the receipt based on the access information.

8. The control method described in claim 7, wherein
printing the receipt based on the transaction information.

9. The control method described in claim 7, further comprising:
determining whether the identification information is input from the external device during a specific period of time after the transaction information is input from the POS terminal, and
if the identification information is not input during the specific period of time, printing the receipt based on the transaction information.

10. The control method described in claim 7, wherein the identification information database stores a print receipt flag corresponding to the identification information, the control method further comprising:
determining whether or not to print the receipt based on the print receipt flag.

11. The control method described in claim 10, further comprising:
acquiring the print receipt flag from the remote server.

* * * * *